United States Patent

Hansson

[11] Patent Number: 5,971,672
[45] Date of Patent: Oct. 26, 1999

[54] MILLING CUTTING INSERT

[75] Inventor: Lars-Ola Hansson, Sandviken, Sweden

[73] Assignee: Sandvik AB, Sandviken, Sweden

[21] Appl. No.: 08/817,949

[22] PCT Filed: Oct. 25, 1995

[86] PCT No.: PCT/SE95/01260

§ 371 Date: Apr. 28, 1997

§ 102(e) Date: Apr. 28, 1997

[87] PCT Pub. No.: WO96/12583

PCT Pub. Date: May 2, 1996

[30]     Foreign Application Priority Data

Oct. 21, 1994 [SE] Sweden .................................. 9403621

[51] Int. Cl.⁶ ..................................................... B23C 5/20
[52] U.S. Cl. ........................... 407/114; 407/113; 407/116
[58] Field of Search ..................................... 407/114, 113, 407/116

[56]                 References Cited

U.S. PATENT DOCUMENTS

| 4,632,607 | 12/1986 | Pantzar . | |
|---|---|---|---|
| 4,776,733 | 10/1988 | Pettersson . | |
| 5,143,487 | 9/1992 | Shirai et al. | 407/117 |
| 5,145,295 | 9/1992 | Satran | 407/113 |
| 5,199,827 | 4/1993 | Pantzar . | |
| 5,388,932 | 2/1995 | DeRoche et al. | 407/113 |
| 5,437,522 | 8/1995 | Satran et al. | 407/114 |
| 5,454,670 | 10/1995 | Noda et al. | 407/114 |
| 5,593,255 | 1/1997 | Satran et al. | 407/116 |
| 5,597,271 | 1/1997 | Men et al. | 407/113 |
| 5,695,303 | 12/1997 | Buiabhiu et al. | 407/114 |
| 5,720,583 | 2/1998 | Bohnet et al. | 407/113 |

FOREIGN PATENT DOCUMENTS 4309897  8/1994  Germany .

OTHER PUBLICATIONS

Sumitomo Brochure No. 359 (undated).

*Primary Examiner*—Daniel W. Howell
*Assistant Examiner*—Mark Williams
*Attorney, Agent, or Firm*—Burns, Doane, Swecker & Mathis, L.L.P.

[57]                ABSTRACT

The present invention relates to a milling cutting insert having an upper side, a bottom side, and flank surfaces connecting the upper and bottom sides. At each operative cutting corner there is a projection which is depressed relative to the adjacent main cutting edge and corner cutting edge. At the front upper edge of the projection is the wiper edge that generates the surface on the workpiece. By tipping the cutting insert axially positively and radially negatively, the horizontally located wiper edge may be tipped frontwards into contact with the workpiece, while the vertically located wiper edge is tipped backwardly, so that it does not reach the workpiece. In this way an improved axial clearance is made possible and an undesired groove in the workpiece is avoided, which would otherwise be caused by the vertically located wiper edge.

13 Claims, 5 Drawing Sheets

MILLING CUTTING INSERT

TECHNICAL FIELD

The present invention relates to a milling cutting insert of a preferably square basic shape, with depressed parallel lands. The cutting insert is suited for the milling of right-angled corners. Usually, such inserts are made of coated or uncoated cemented carbide, but occasionally also certain ceramic materials may be used.

BACKGROUND OF THE INVENTION

Often cutting tools with indexable cutting inserts for the milling of right-angled corners in a workpiece have had cutting inserts of a rhombic or triangular shape. They have only two or three cutting edges but for a long time they were considered to be the only ones which make it possible to cut right-angular corners with sufficient side clearance. When a conventional right-angled indexable cutting insert is used for milling or turning of an internal side surface, it cannot be positioned with a radial or axial angle without its lower inner corner trailing on the generated surface. Hence, when cutting an inner 90° shoulder it has been common practice to use either an insert with an acute angle between the main cutting edge and the secondary cutting edge or the parallel land, respectively, or also right-angled cutting inserts inserted into the tool body with a negative radial angle and a positive axial angle.

In U.S. Pat. No. 4,632,607 an indexable cutting insert is disclosed with a square basic shape for the milling of right-angled corners, which insert comprises four main cutting edges, thus realizing a substantially improved cutting economy. This is achieved by the fact that each main cutting edge has an appurtenant secondary cutting edge which is arranged outside the square basic shape upon a protrusion that sticks out in a direction mainly parallel to the appurtenant main cutting edge. This cutting insert works satisfactorily at a total cutting depth less than the length of the main cutting edge. However, if one intends to arrive at a total cutting depth that exceeds the length of the main cutting edge by performing several runs, then a protrusion will cause an undesired groove in the workpiece.

In U.S. Pat. No. 5,199,827 a further indexable cutting insert for milling is disclosed having a square basic shape. The insert is intended to be inclined axially positively and radially negatively in the milling cutter body. Sufficient axial clearance is obtained by inclining the insert radially negatively. Each flank surface is shaped with a planar relief surface, whose width increases in a direction towards one of the corners of the insert. Sufficient radial clearance between the parallel land and the main cutting edge is intended to be obtained by the angle between the parallel land and the adjacent main cutting edge of about 0 to 2°. However, since the relatively short parallel land has to support considerable stress, it may become worn, whereby also the main cutting edge comes into contact with the generated surface on the workpiece, resulting in decreased surface smoothness, increased heat production and increased cutting forces.

SUMMARY OF THE INVENTION

Thus, a primary object of the present invention is to provide a milling cutting insert with an improved clearance axially.

Another object of the present invention is to design a milling cutting insert which removes the inconvenience connected with the cutting insert as disclosed in U.S. Pat. No. 4,632,607.

These and further objects have been achieved in a surprising way by shaping a milling cutting insert with the features as defined in the charachterizing clause of claim 1.

BRIEF DESCRIPTION OF THE FIGURES

For illustrative but non-limiting purposes, the invention will now be further described under reference to the appended drawings. These are herewith presented.

DETAILED DESCRIPTION OF THE PREFERRED EMBODIMENTS

Figure 1:
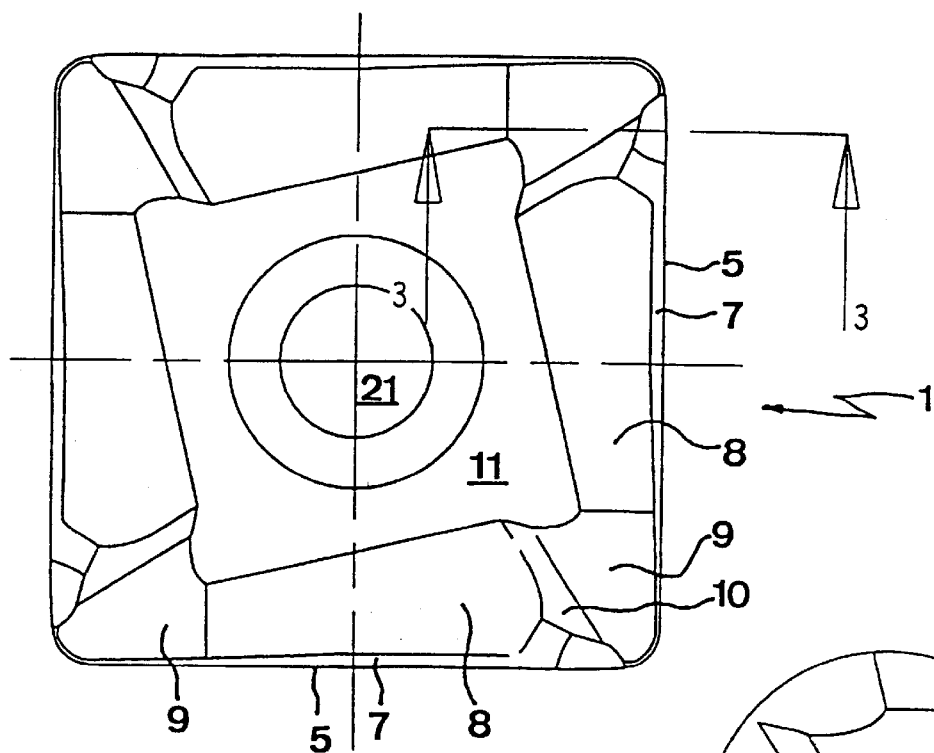
FIG. 1 shows a milling cutting insert, straight from above.
Figure 1A:
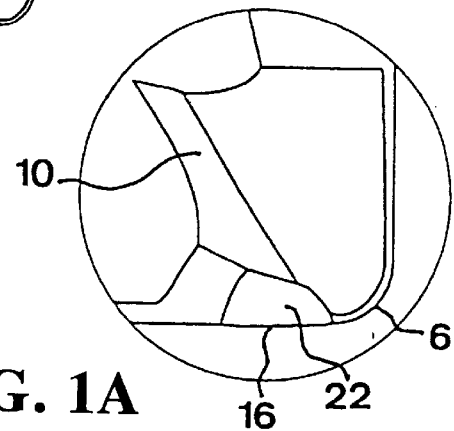
FIG. 1A shows an amplification of a corner section of the cutting insert of FIG. 1.

A cutting insert according to the invention is generally designated by reference numeral 1. Generally, it has an upper side 2 and a substantially planar lower side 3. According to the illustrated embodiment, said upper and lower sides are connected by four side surfaces 4 of substantially the same size and shape, since the cutting insert preferentially has a square basic shape. However, it may also have another basic shape, e.g., rectangular or triangular. The square basic shape is preferred since it is the only one that makes possible four operative main cutting edges, which of course is the most advantageous for the cutting economy.

The upper surface 2 and the side surfaces 4 meet along break lines which form main cutting edges 5. At the corner, this main cutting edge transposes into a corner cutting edge 6, which usually is rounded, but which also may comprise one or several substantially straight chamfers. On the upper side adjoins a primary land 7 to the main cutting edge and the corner cutting edge. To this primary land adjoins chip surfaces 8 and 9, respectively. The transition between chip surfaces 8 and 9 in an insert corner takes place via an inclined transposition surface 10. Since the corner end of chip surface 8 is situated higher than the corner chip surface 9, the transposition surface 10 inclines from chip surface 9 upwardly towards chip surface 8. The chip surfaces 8 and 9 and the transposition surfaces 10 are inwardly delimited by a substantially planar part upper surface 11, which is substantially parallel with bottom surface 3. In the middle of part upper surface 11 is provided a through center aperture 21 for introducing a suitable fastening device, such as a locking screw, a clamp, a locking pin, etc.

The cutting insert has a positive geometry, i.e., the flank surfaces 4 are arranged in planes that form an obtuse angle to the plane of the bottom surface 3 and an acute angle to the upper plane that is defined by the main cutting edges 5. Preferably, the parts of the flank surfaces 4 adjacent to the main cutting edges are shaped as planar or helically twisted primary relief surfaces 12, which at their lower limits join the secondary relief surfaces 13 via a break line. However, alternatively, the primary relief surface 12 may be disposed of, the relief surface 13 coinciding with flank surface 4. Corresponding primary and secondary relief surfaces 14 and 15, respectively, are provided below the corner cutting edge 6.

Figure 2:
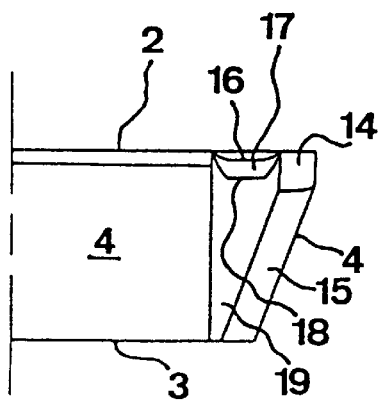
FIG. 2 shows a section of the cutting insert according to FIG. 1, straight from the side.
Figure 6:
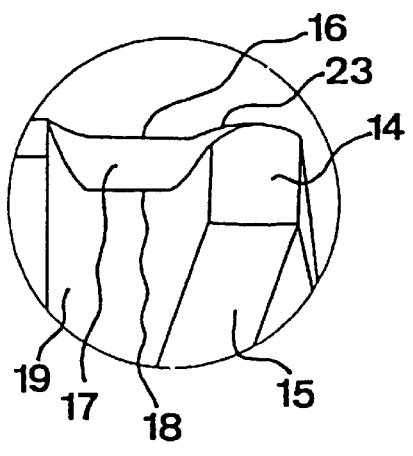
FIG. 6 shows a modified embodiment of an insert corner, seen obliquely fron underneath.
Figure 7:
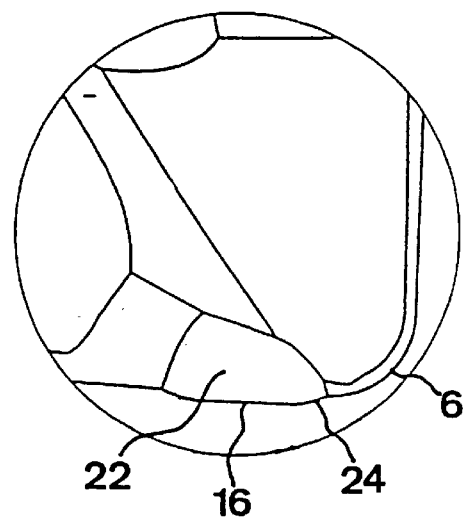
FIG. 7 shows a modified corner portion straight from above, in the same way as in FIG. 1A.
Figure 8:
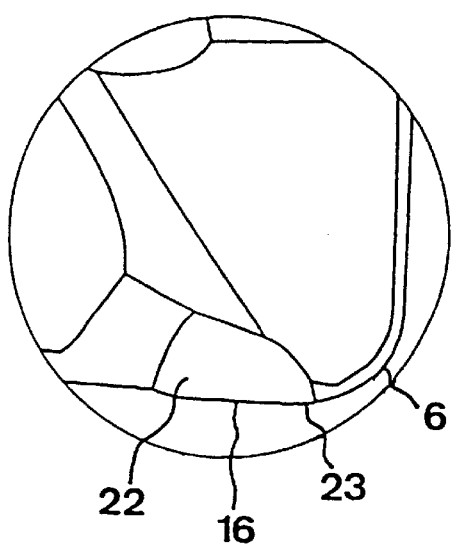
FIG. 8 shows the modified corner portion according to FIG. 6, straight from above, as in FIG. 6.
Figure 9:
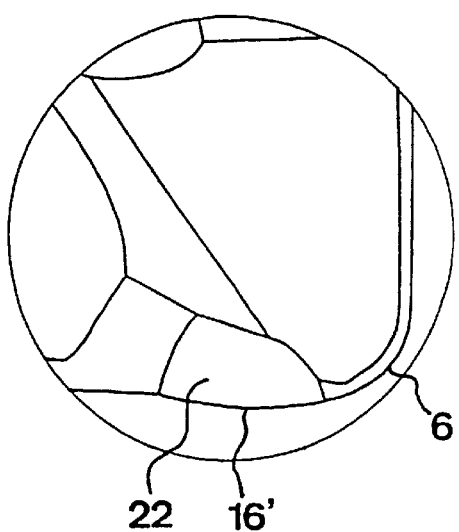
FIG. 9 shows a modified corner portion straight from above, in the same way as in FIG. 1A.

The essential feature of the present invention is the configuration of the parallel land or parallel land cutting edge, which is the cutting edge of the cutting insert that generates the surface. In the figures, this cutting edge is designated by 16, 16A, 16' or 16" and is depressed in relation to the main cutting edge and possibly also to the corner cutting edge, the latter being shown in for instance FIG. 2 and 6. Vertically, this level difference may be between 0,05 and 0,5 mm, preferably between 0,1 and 0,4 mm. The parallel land cutting edge is provided upon a projection 17 protruding from the center of the cutting insert, which projection continues into the secondary relief surface 19, preferably via a break line 18 or a radius surface. This relief surface 19 is either planar or slightly curved and is delimited towards the secondary relief surfaces 4 and 15 by break lines 20 or smooth radius transitions. Alternatively, the relief surface 19 may lie in the same plane as the secondary relief surface 13, in which case the break line 20 between these is dropped.

Equally to the other relief surfaces, the secondary relief surface 19 below the parallel land is positive and has an angle α to the extension of the bottom surface. Suitably, this angle is between 50 and 80°, preferably between 60 and 77°. The angle β of the projection 17 to the bottom surface may be equally large as α, whereby the relief surface of the projection coincides with the relief surface 19, or preferably somewhat smaller, suitably between 50 and 75° and preferably between 53 and 70°, provided that β≦α. The difference between α and β can suitably be between 4 and 20°, preferably between 6 and 15°.

The parallel land cutting edge 16 is the break line along the upper front edge of projection 17. According to FIGS. 1 to 9, this front edge is depressed relative to the main cutting edge and the corner cutting edge by a depression or a depressed recess 22. Like the rest of the cutting insert, this recess is preferably pressed before the sintering, but it can also be ground. Suitably, the recess can have a cross-section with the shape of a rectangle, a circle segment, a frustrum of a circle segment, or a trapezoid.

Figure 3:
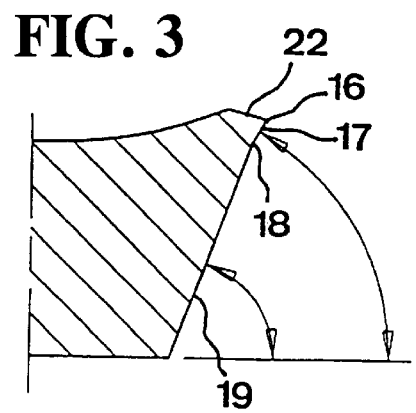
FIG. 3 shows the cross-section A—A in FIG. 1.

As may be most clearly seen in the cross-section A—A in FIG. 3, the recess 22 may be negatively angled relative to the bottom surface 3. However, the inclination of the recess may be varied within relatively wide limits, for instance between +20 and −20°, preferably between +5 and −10°.

Figure 4:
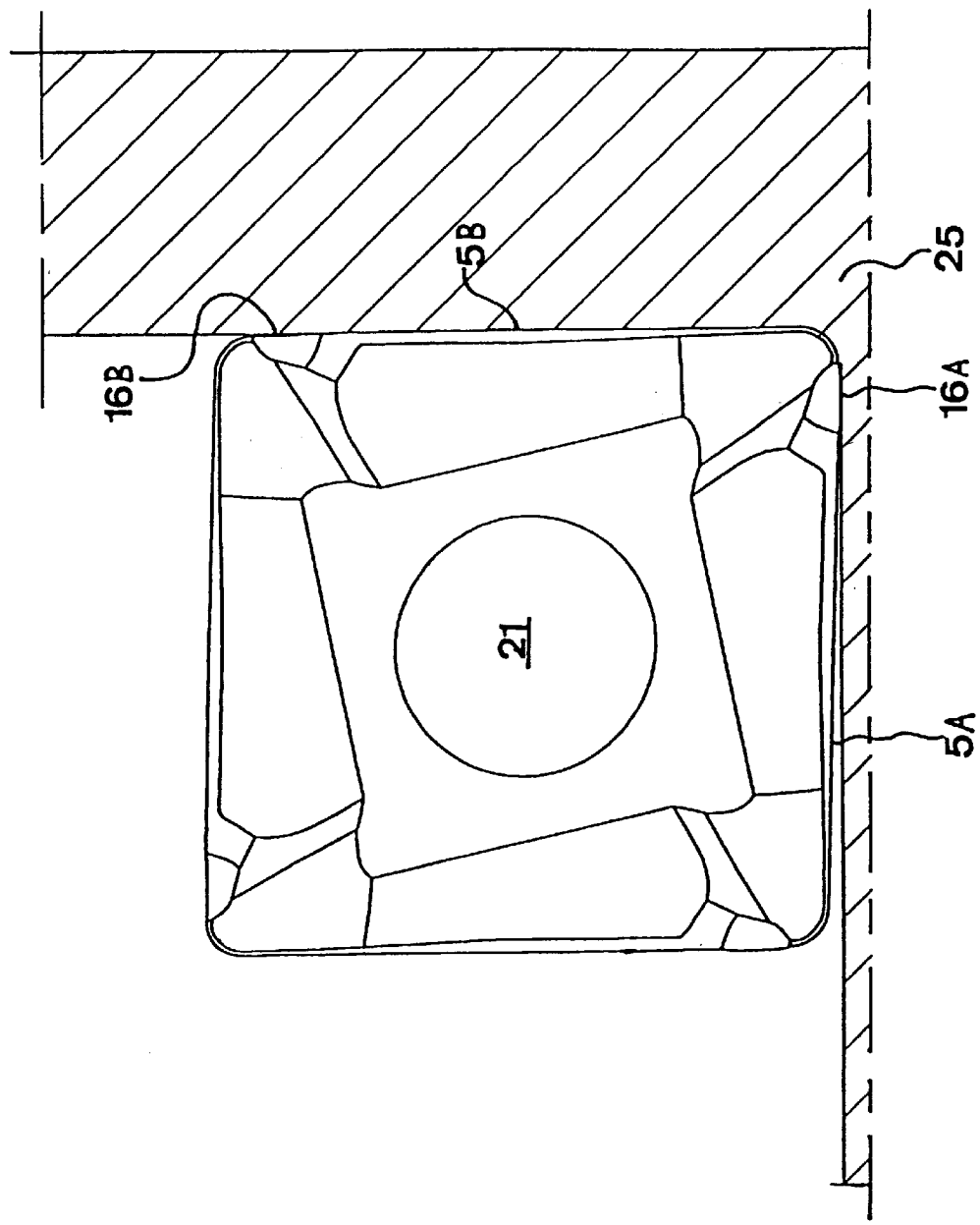
FIG. 4 illustrates the functional positioning of the cutting insert relative to a workpiece.
Figure 5:
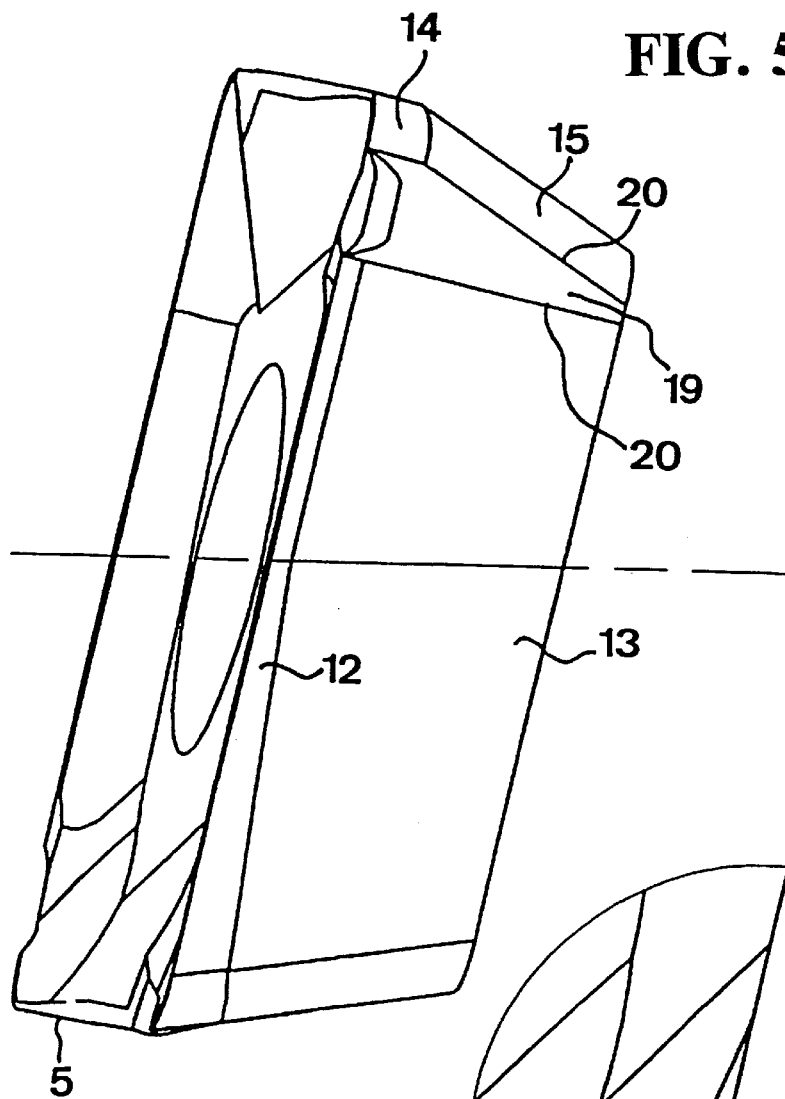
FIG. 5 illustrates the functional positioning of a cutting insert according to the invention.
Figure 5A:
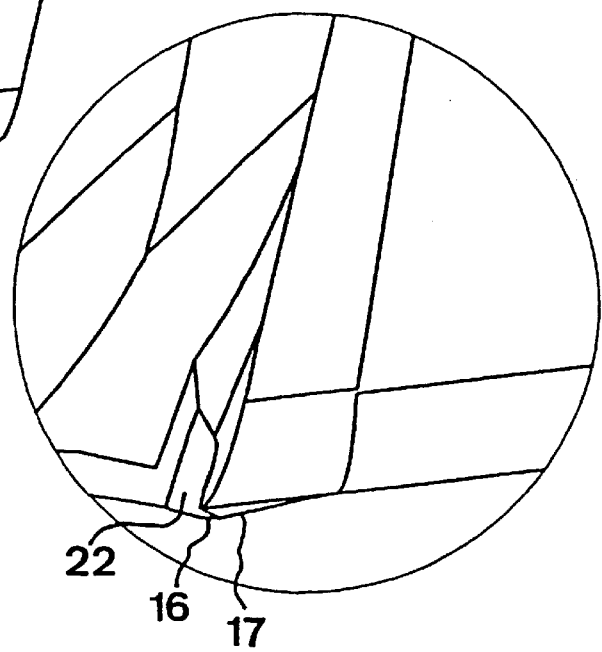
FIG. 5A shows an amplification of a corner section of the cutting insert according to FIG. 5.

By the depressed and protruding position of the parallel land relative to the other operative cutting edges, a number of hitherto unattained advantages have been achieved, as may be best seen in FIG. 4. By positioning the milling cutting insert functionally in the milling cutter body, so that it assumes a positive axial inclination, the lower, surface-generating parallel land cutting edge 16A is tipped forwards. For instance, if there is a level difference of about 0,2 mm between the main cutting edge and the wiper edge, a tipping forwards of the wiper edge 16A can be effected by a positive axial inclination, so that it protrudes by about a further 0,07 mm in comparison with the cutting insert disclosed in U.S. Pat. No. 5,199,827. This contributes to further clearance between the generated surface and the main cutting edge 5A, which may be seen in the wedge-shaped play in FIG. 4 between said cutting edge 5A and the workpiece 25. Correspondingly, the parallel land cutting edge 16B can be tipped inwards by a negative radial inclination of the cutting insert, so that this parallel land cutting edge does not come into contact with the vertical surface of the workpiece, thereby not causing any groove in the latter. Contrary to this, the main cutting edge 5B is in engagement along its whole length, this also being the purpose.

Within the framework of the invention, the parallel land cutting edge 16 can have a plurality of embodiments. Thus, it can be substantially straight and have a radius continuation 23 to the corner cutting edge 6, as may be seen in FIGS. 6 and 8, the radius continuation being formed as a depressed curve. Further, the parallel land cutting edge can be straight and have a substantially straight chamfer continuation 24 to the corner radius, in accordance with FIG. 7. Furthermore, the parallel land cutting edge may be slightly curved or rounded, as illustrated by the cutting edge 16' in FIG. 9.

Figure 10:
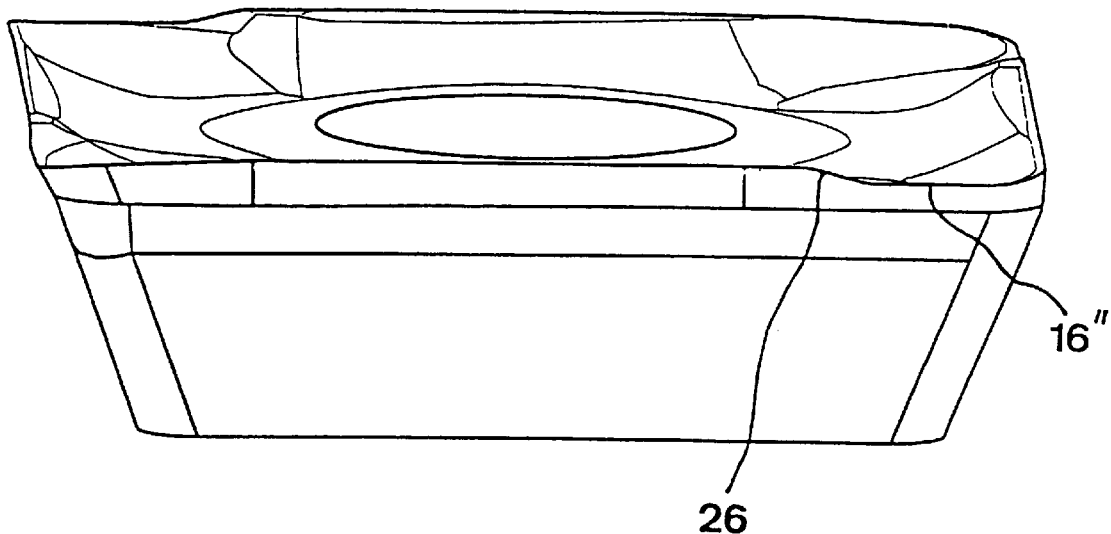
FIG. 10 shows a perspective view obliquely from above of another embodiment of the invention.
Figure 11:
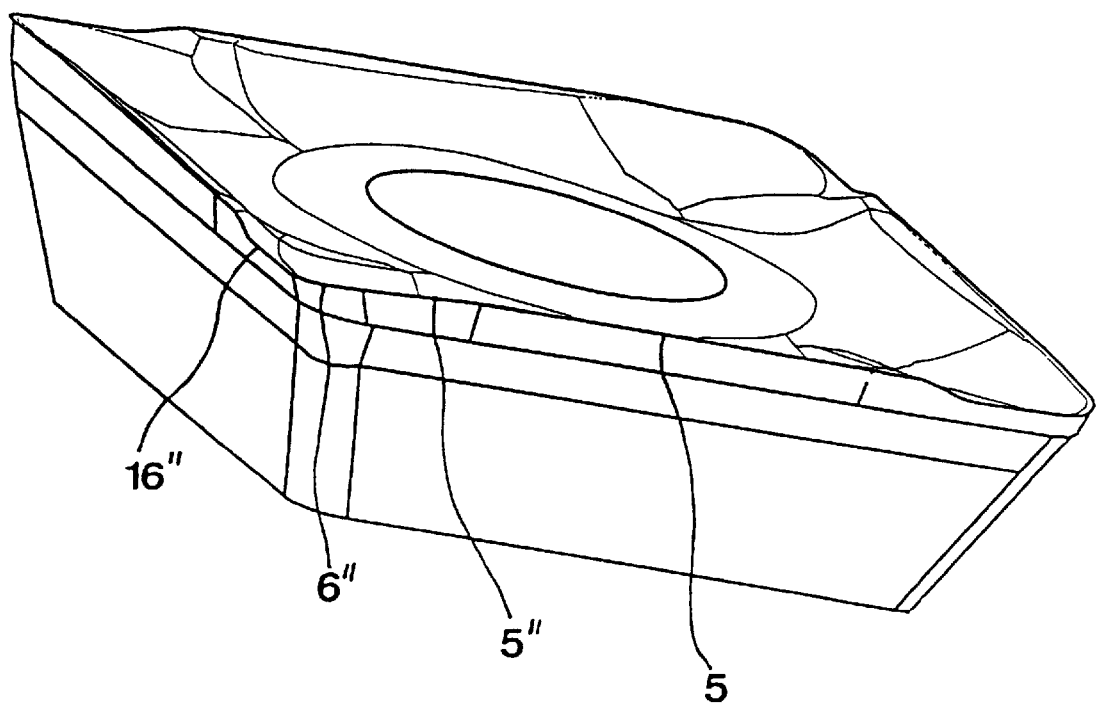
FIG. 11 shows another perspective view of the cutting insert according to FIG. 10.

Moreover, the parallel land cutting edge can be shaped according to FIG. 10 and 11. Equally to the embodiments according to FIGS. 1 to 8, there is first a relatively sharp transition 26 between the main cutting edge 5 and the parallel land 16". However, contrary to the previously described embodiments, there is a stepless and continuous transition to the corner cutting edge 6", which is also depressed in comparison with the main cutting edges 5. From a lowermost point adjacent to the parallel land cutting edge 16", the corner cutting edge 6" rises in a direction towards the next main cutting edge. Also a portion of this main cutting edge 5 slopes somewhat, namely the portion 5". Thus, the upward slope vertically starts at the parallel land cutting edge 16", then it goes continuously and substantially uniformly along the corner cutting edge 6" and does not terminate till the transition between cutting edges 5" and 5. Suitably, the cutting edge portion 5" is ≦3 mm. The parallel land cutting edge is suitably ≦2 mm.

By this construction with a depressed corner cutting edge, the cutting insert has become even more easy-cutting (lower cutting forces), it generates very smooth surfaces and does not cause any creation of grains. Further, the corner cutting edge has obtained between 1 and 2° larger clearance in comparison with the embodiments according to FIGS. 1 to 9.

I claim:

1. Milling cutting insert for the chip-breaking machining of an internal, right-angular corner in a workpiece, said cutting insert comprising:
    upper side,
    a bottom side,
    a plurality of flank surfaces connecting the upper and bottom sides, and
    four corner portions provided between said flank surfaces, each of said corner portions including a plurality of corner flank surfaces,
    wherein the upper side connects to each of the flank surfaces along a main cutting edge and to each of the corner flank surfaces along a corner cutting edge,
    wherein each corner portion includes a projection having an upper surface that is depressed relative to an adjacent said main cutting edge, a front upper edge of the projection at least partly forming a wiper edge for generating a generally smooth surface on the workpiece, the wiper edge protruding outwards from a substantially vertical plane of the adjacent said main cutting edge.

2. Milling cutting insert according to claim 1, wherein the upper surface of the projection is depressed by a recess in the upper side of the cutting insert.

3. Milling cutting insert according to claim 2, wherein the upper surface of the projection is also depressed relative to said corner cutting edge.

4. Milling cutting insert according to claim 2, wherein the corner cutting edge is depressed relative to the main cutting edge, the lowermost point of the corner cutting edge connecting to the wiper edge and then sloping upwardly in the direction towards said main cutting edge adjacent thereto.

5. Milling cutting insert according to claim 1, wherein the cutting insert has a positive geometry such that the flank surfaces form an acute angle to the upper side and an obtuse angle to the bottom side.

6. Milling cutting insert according to claim 5, wherein a secondary relief surface is located below the projection and forms an acute angle to a plane that is defined by the bottom side of the cutting insert.

7. Milling cutting insert according to claim 6, wherein a relief surface of the projection forms an acute angle to the plane defined by the bottom side of the cutting insert, the projection relief surface angle being no greater than the corresponding angle that is formed by said secondary relief surface.

8. Milling cutting insert according to claim 1, wherein said insert has a basic square shape and comprises four wiper edges each being located on a respective said projection.

9. Milling cutting insert according to claim 1, wherein the wiper edge is curved.

10. Milling cutting insert according to claim 9, wherein the wiper edge is substantially straight.

11. Milling cutting insert according to claim 1, wherein said corner portions are rounded.

12. Milling cutting insert according to claim 1, wherein said projection includes a protruding portion.

13. Milling cutter tool for the chip-breaking machining of an internal, right-angular corner in a workpiece, the milling cutter tool being rotatable around a central axis of rotation and including insert seats for accommodating detachable indexable milling cutting inserts, said milling cutter tool comprising at least one milling cutting insert including an upper side, a bottom side, a plurality of flank surfaces connecting said upper and bottom sides, and four corner portions provided between two adjacent said flank surfaces, each of said corner portions including a plurality of corner flank surfaces, said upper side being connected to each said flank surface along a main cutting edge and to each said corner flank surface along a corner cutting edge, each corner portion further including a projection having an upper surface depressed relative to an adjacent said main cutting edge, at least a portion of a front upper edge of said projection forming a wiper edge for generating a generally smooth surface on the workpiece, the wiper edge protruding outwards from a substantially vertical plane of the adjacent said main cutting edge.

* * * * *